US009755748B2

(12) United States Patent
Ohtou et al.

(10) Patent No.: US 9,755,748 B2
(45) Date of Patent: Sep. 5, 2017

(54) TRANSMISSION APPARATUS AND METHOD FOR CONTROLLING THE TRANSMISSION APPARATUS

(71) Applicant: FUJITSU LIMITED, Kawasaki-shi (JP)

(72) Inventors: Makoto Ohtou, Fukuoka (JP); Mitsuo Yoneda, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/525,248

(22) Filed: Oct. 28, 2014

(65) Prior Publication Data

US 2015/0043914 A1    Feb. 12, 2015

Related U.S. Application Data

(62) Division of application No. 13/211,704, filed on Aug. 17, 2011, now Pat. No. 8,903,248.

(30) Foreign Application Priority Data

Aug. 25, 2010  (JP) ................................ 2010-188772

(51) Int. Cl.
    *H04B 10/27*     (2013.01)
    *H04B 10/077*    (2013.01)
    (Continued)

(52) U.S. Cl.
    CPC ......... *H04B 10/27* (2013.01); *H04B 10/0779* (2013.01); *H04B 10/50* (2013.01);
    (Continued)

(58) Field of Classification Search
    None
    See application file for complete search history.

(56) References Cited

U.S. PATENT DOCUMENTS

| 2003/0025960 | A1 | 2/2003 | Benvenuti et al. |
| 2003/0048805 | A1* | 3/2003 | Yoshihara ............. H04J 3/1694 370/468 |
| 2007/0019957 | A1 | 1/2007 | Kim et al. |

FOREIGN PATENT DOCUMENTS

JP    2005-080037    3/2005

OTHER PUBLICATIONS

USPTO, (Wolf) Notice of Allowance and Notice of Allowability, Aug. 11, 2014, in parent U.S. Appl. No. 13/211,704 [allowed].

(Continued)

*Primary Examiner* — Darren E Wolf
(74) *Attorney, Agent, or Firm* — Fujitsu Patent Center

(57) ABSTRACT

A transmission apparatus includes: a data signal processor to add first data of a control signal to a data signal received, and transmit the data signal; a first signal output module to output second data of the control signal; an update controller to control an update of a function included in the first signal output module; and a second signal output module, when receiving a notice of an instruction for updating the function from the update controller, to output the first data that is the second data held therein when the notice thereof is received, wherein the second signal output module, when receiving a notice of a completion for updating the function from the update controller, outputs the first data that is the second data received from the first signal output module updated by the update controller.

2 Claims, 10 Drawing Sheets

(51) Int. Cl.
*H04J 3/16* (2006.01)
*H04B 10/50* (2013.01)

(52) U.S. Cl.
CPC ........ *H04J 3/167* (2013.01); *H04B 2210/072* (2013.01); *H04J 2203/0057* (2013.01)

(56) References Cited

OTHER PUBLICATIONS

USPTO, (Wolf) Restriction Requirement, Apr. 18, 2014, in parent U.S. Appl. No. 13/211,704 [allowed].

* cited by examiner

TRANSMISSION APPARATUS AND METHOD FOR CONTROLLING THE TRANSMISSION APPARATUS

CROSS-REFERENCE TO RELATED APPLICATION

This application is a divisional of application Ser. No. 13/211,704, filed Aug. 17, 2011, which is based upon and claims the benefit of priority of the prior Japanese Patent Application No. 2010-188772, filed on Aug. 25, 2010, the entire contents of which are incorporated herein by reference.

FIELD

The embodiments discussed herein are related to a transmission apparatus and a method for controlling the transmission apparatus.

BACKGROUND

In a current optical core network, an optical transmission standard called "Optical Transport Network (OTN)" is widely used as a base platform. In OTN, data is transmitted using Synchronous Optical Network (SONET) or Synchronous Digital Hierarchy (SDH), which is a standard for a digital synchronous transmission method used for an existing telephone service and the like.

A transmission apparatus having a transmission method in which SONET or SDH is used, transmits a synchronous multiplexed signal that an overhead signal (OH) is added to a multiplexed data signal. The OH is a signal for performing monitoring, maintenance, and operation of the transmission apparatus and a communication network. The synchronous multiplexed signal may be referred to as a "frame" as a unit thereof hereinafter. By adding overhead data to a frame, the reliability of data transmission can be improved.

By having appropriate information in a processing module that provides overhead function, it is possible to realize monitoring, maintenance, and operation according to demands in the operation management of data transmission. For example, a signal fail (SF) and signal degradation (SD) on a receiver of the transmission apparatus are detected as failure. By adding Automatic Protection System (APS) bytes (K1 and K2 bytes) in which such information (SF and SD) has been had to a frame, another transmission apparatus is notified of information regarding the transmission apparatus in order to perform switching control. In addition, by adding JO byte having a section tracing function to a frame, it is possible to monitor connection of paths. Since the usage of overhead is different between users, it is necessary to change a specification of the overhead function different in each user. The "overhead function" herein refers to a function realized by transferring overhead, and the "specification change of the overhead function" herein refers to, for example, a specification change of data included in overhead.

Technologies used for a specification change of the overhead function as described below have been proposed. One of the technologies is a technology in which a specification of the overhead function is changed by upgrading firmware so as to change a setting value of a processing module that performs setting of a data signal. In addition, another technology has been proposed in which a processing module that provides the overhead function is configured by a Field-Programmable Gate Array (FPGA) that can be overwritten. In this technology, when a specification change of the overhead function needs to be performed, the FPGA is overwritten, and then reconfiguration is performed to change the specification of a processing module that provides the overhead function. Furthermore, another technology has been proposed in which an FPGA that configures the processing module that provides the overhead function is duplicated. In this case, when one of the FPGAs is subjected to a specification change, the other FPGA is selected and used to perform processing, and then the FPGA that has been subjected to the specification change is selected and used to perform processing (For example, refer to Japanese Laid-open Patent Publication No. 2005-80037).

SUMMARY

According to an aspect of the embodiment, there is provided a transmission apparatus including: a data signal processor to add first data of a control signal to a data signal received, and transmit the data signal to other transmission apparatus; a first signal output module to output second data of the control signal; an update controller to control an update of a function included in the first signal output module; and a second signal output module, when a notice of an instruction for updating the function included in the first signal output module from the update controller is received, to output the first data of the control signal that is the second data of the control signal held in the second signal output module when the notice of the update instruction is received, wherein the second signal output module, when a notice of a completion for updating the function included in the first signal output module from the update controller is received, outputs the first data of the control signal that is the second data of the control signal received from the first signal output module updated by the update controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a specification change performed by upgrading firmware, because an update is performed for each frame at intervals of 125 µs, there is a time lag in execution of a specification change.

On the other hand, if a processing module that provides the overhead function is configured by an FPGA, as in the related art example, the time lag in execution of a specification change can be reduced. However, in this technology, the transmission apparatus may not be able to transmit a data signal during reconfiguration of the FPGA and therefore there is a problem in that fails of the data signal are caused.

In addition, in the configuration in which the FPGA that configures a processing module that provides the overhead function is duplicated, it is possible to perform a specification change of the overhead function without causing fails of the data signal. However, in this technology, since two FPGA having the same configuration need to be provided, costs are high and the size of circuits is large, leading to an inefficient configuration in terms of costs and actual installation.

Embodiments of a transmission apparatus and a method for controlling the transmission apparatus disclosed herein will be described hereinafter in detail on the basis of the drawings. It is to be understood that the following embodiments do not limit the transmission apparatus and the method for controlling the transmission apparatus disclosed herein.

Figure 1:
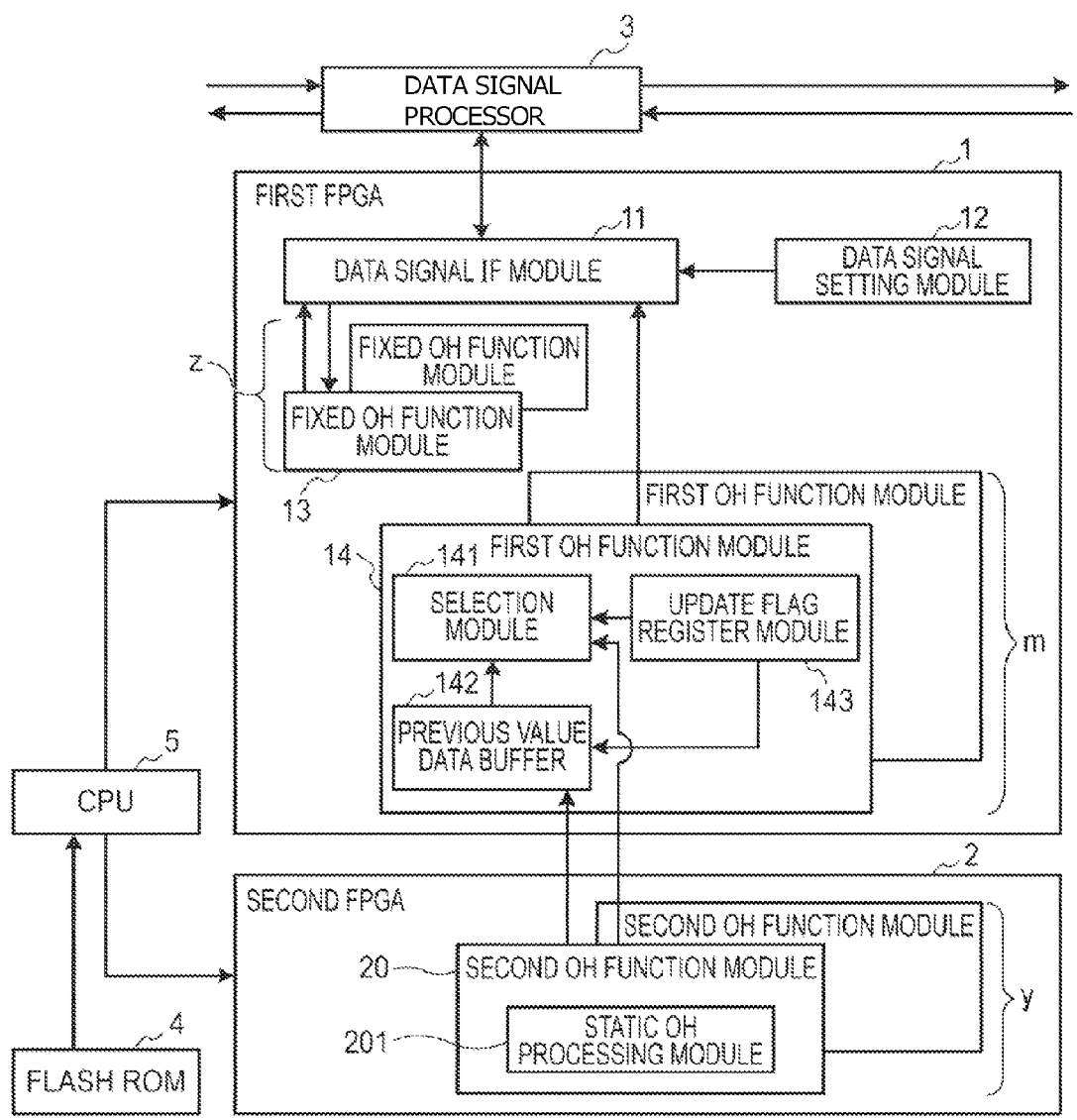
FIG. 1 is a block diagram of a transmission apparatus according to a first embodiment.
Figure 2:
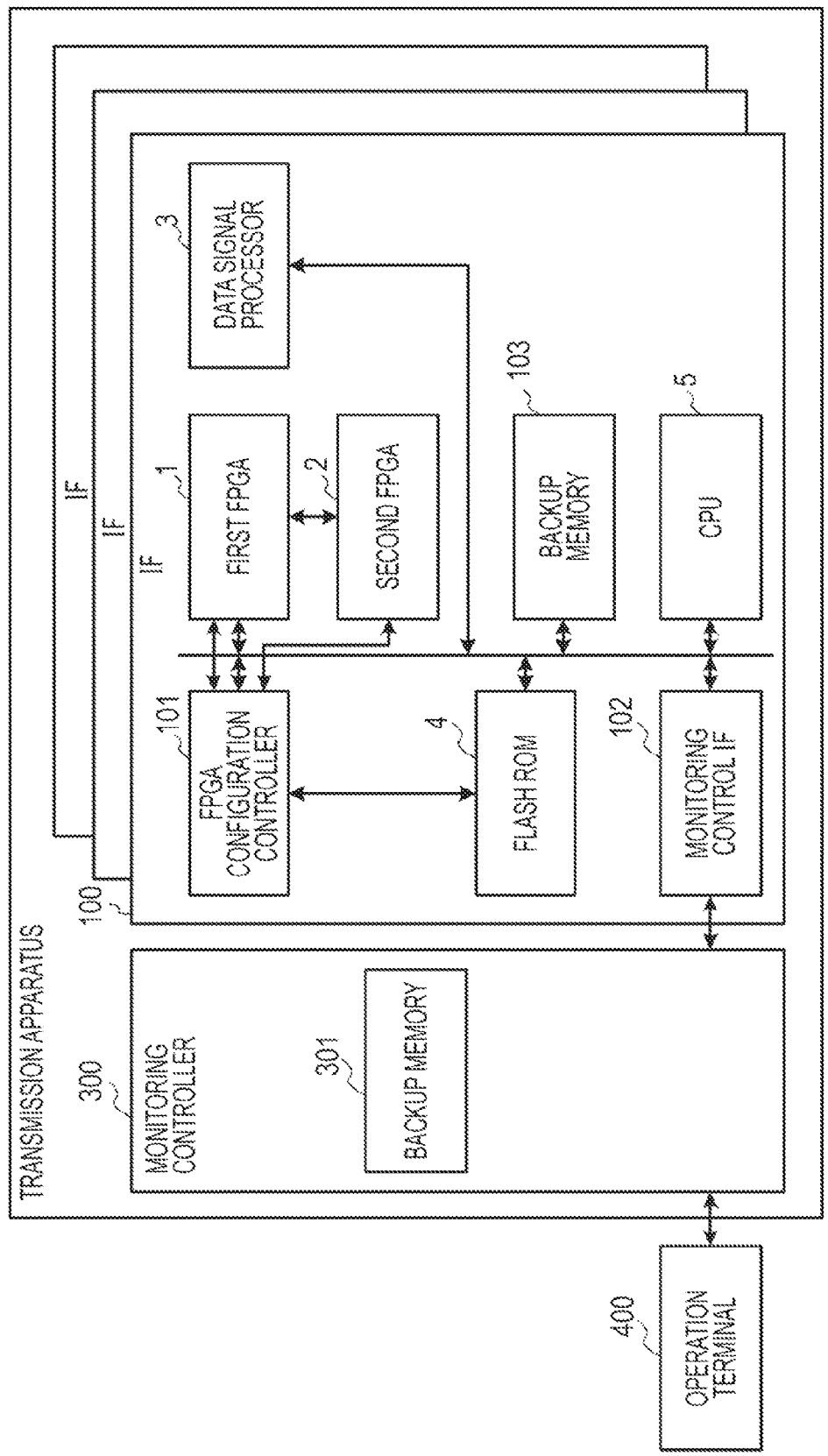
FIG. 2 is a block diagram illustrating the entirety of the transmission apparatus.

FIG. 1 is a block diagram of a transmission apparatus according to a first embodiment. FIG. 2 is a block diagram illustrating the entirety of the transmission apparatus. FIG. 1 illustrates an interface (IF), which is a part of the transmission apparatus illustrated in FIG. 2. In the transmission apparatus according to this embodiment, each overhead function to be subjected to a specification change is a function of adding a fixed value to a data signal as the overhead data. That is, in the transmission apparatus according to this embodiment, the overhead function to be subjected to a specification change is a function of adding static overhead data to an input data signal. In this case, even if, for example, incorrect data is inserted into a part of overhead subjected to a specification change, only a function such as a redundancy alarm is executed. Therefore, even if dummy data is simply added to a part of overhead to be subjected to a specification change, there is no problem. More specifically, this includes a case in which data to be added to JO byte is changed, and, for example, a case in which the data to be added is changed from 64-bit data to 128-bit data. The overhead is an example of a "control signal".

As illustrated in FIG. 1, the transmission apparatus according to this embodiment has a data signal processor 3, a first FPGA 1, a second FPGA 2, and a flash read-only memory (ROM) 4. The flash ROM 4 may be referred to as an "FPGA configuration flash ROM". As illustrated in FIG. 2, these components are included in an IF 100 of the transmission apparatus.

Furthermore, as illustrated in FIG. 2, the transmission apparatus according to this embodiment has the IF 100 and a monitoring controller 300. The transmission apparatus according to this embodiment is coupled to an operation terminal 400.

The data signal processor 3 is materialized with an application-specific integrated circuit (ASIC). The data signal processor 3 receives a data signal from an external apparatus (hereinafter referred to as "the other apparatus") that transmits and receives data to and from the transmission apparatus. Here, the data signal is data according to SONET/SDH. Since a SONET/SDH frame complies with an International Telecommunication Union (ITU) recommendation, detailed description of the SONET/SDH frame is omitted.

The data signal processor 3 performs processes such as parallel-to-serial conversion and serial-to-parallel conversion for data signal serial output and serial input, and also performs determination of routing paths. In addition, the data signal processor 3 outputs information used to process overhead, such as the number of errors and the content of errors included in received data signals, to the first FPGA 1, which will be described later. In addition, the data signal processor 3 receives, from the first FPGA 1, overhead data to be added to a data signal. The data signal processor 3 then adds the overhead data received from the first FPGA 1 to the data signal. Furthermore, the data signal processor 3 makes the setting of the data signal using setting information of the data signal received from the first FPGA 1. The data signal processor 3 then outputs to the other apparatus the data signal to which overhead data has been added. The data signal processor 3 is an example of a "data signal processor".

The first FPGA 1 has a data signal IF module 11, a data signal setting module 12, fixed OH function modules 13, and first OH function modules 14. Here, the first FPGA 1 has a fixed OH function module 13 per specification of overhead, that is, one module for each overhead function. In this embodiment, the first FPGA 1 has z fixed OH function modules 13. In addition, the first FPGA 1 has one first OH function module 14 for each specification of the overhead. In this embodiment, the first FPGA 1 has m first OH function modules 14. A case in which any of the m specifications of overhead is updated will be described hereinafter. One of the first OH function modules 14 that has the specification of the overhead to be updated will be simply referred to as the first OH function module 14.

The data signal IF module 11 is an interface for communication of data between the data signal processor 3 and the first FPGA 1. The data signal IF module 11 receives a data signal output from the data signal processor 3. In addition, the data signal IF module 11 outputs overhead output from the fixed OH function module 13 and the first OH function module 14 and setting information of a data signal output from the data signal setting module 12 to the data signal processor 3.

The data signal setting module 12 outputs setting information of a data signal regarding the setting of clocks and the setting of reset timing of the data signal and the like.

The overhead functions controlled by the fixed OH function modules 13 are functions that are not to be subjected to a specification change. One fixed OH function module 13 is provided for each overhead function. That is, there are the same number (z in this embodiment) of fixed OH function modules 13 as the number of overhead functions that are not to be subjected to a specification change.

The fixed OH function modules 13 receive data used to process overhead, such as the number of errors and the content of errors included in data signals, from the data signal IF module 11. The fixed OH function modules 13 then select overhead data corresponding to the content of errors and the number of errors that have been input thereto, and output the selected overhead data to the data signal IF module 11. Here, the z fixed OH function modules 13 each output overhead data individually. Each of the fixed OH function modules 13 is an example of a "fixed signal output module".

The first OH function modules 14 perform a process for outputting overhead data having a fixed value to a data signal regardless of the content of the data signal. In other words, the first OH function modules 14 statically output the overhead data. One first OH function module 14 is provided for each overhead function. That is, there are the same number (m in this embodiment) of first OH function modules 14 as the number of overhead functions that might be subjected to a specification change.

The first OH function modules 14 receive a notice, from a central processor (CPU) 5, that a second OH function module 20, which will be described later, will be updated. In addition, the first OH function modules 14 receive a notice, from the CPU 5, that the update of the second OH function module 20 has been completed.

The first OH function modules 14 each have a selection module 141, a previous value data buffer 142, and an update flag register module 143. Each of the first OH function modules 14 is an example of a "second signal output module".

When the second OH function module 20 has been selected as the source of overhead data, the selection module 141 switches the source of overhead data to the previous value data buffer 142 upon receiving a switching instruction from the update flag register module 143. The selection module 141 then outputs overhead data received from the previous value data buffer 142 to the data signal IF module 11. At this time, the selection module 141 prevents data input from the second OH function module 20 from overwriting the overhead.

In addition, when the previous value data buffer 142 has been selected as the source of overhead data, the selection module 141 switches the source of overhead data to a second OH function module 20 upon receiving an switching instruction from the update flag register module 143. The selection module 141 then receives overhead data from the second OH function module 20 and outputs the overhead data to the data signal IF module 11.

In the normal operation, the previous value data buffer 142 overwrites overhead data held thereby with overhead data output from a second OH function module 20.

When an update of a second OH function module 20 is performed, the previous value data buffer 142 prevents overhead data output from the second OH function module 20 from overwriting overhead data stored therein upon receiving an instruction for preventing overwriting from the update flag register module 143. That is, the previous value data buffer 142 keeps holding the overhead data stored therein. The previous value data buffer 142 then outputs the overhead data held thereby to the selection module 141.

Furthermore, when the update of the second OH function module 20 has been completed, the previous value data buffer 142 resumes overwriting the overhead data stored therein with overhead data output from the second OH function module 20 upon receiving an instruction for resuming overwriting from the update flag register module 143.

In the normal operation, the update flag register module 143 instructs the previous value data buffer 142 to perform overwriting overhead data output from a second OH function module 20 until receiving a notice that an update of the second OH function module 20 will be performed. Furthermore, in the normal operation, the update flag register module 143 instructs the selection module 141 to select the overhead data output from the second OH function module 20 until receiving a notice that an update of the second OH function module 20 will be performed. This setting state of the update flag register module 143 may be referred to as the "through setting".

Upon receiving the notice that an update of the second OH function module 20 will be performed, the update flag register module 143 instructs the previous value data buffer 142 to prevent performing overwriting the overhead data output from the second OH function module 20. Furthermore, upon receiving the notice that an update of the second OH function module 20 will be performed, the update flag register module 143 instructs the selection module 141 to select the overhead data output from the previous value data buffer 142. This setting state of the update flag register module 143 may be referred to as the "hold setting".

Upon receiving a notice that the update of the second OH function module 20 has been completed, the update flag register module 143 instructs the previous value data buffer 142 to perform overwriting the overhead data output from the second OH function module 20. In addition, upon receiving the notice that the update of the second OH function module 20 has been completed, the update flag register module 143 instructs the selection module 141 to select the overhead data output from the second OH function module 20. That is, upon receiving the notice that an update of the second OH function module 20 has been completed, the update flag register module 143 returns to the through setting, which is a normal operation state.

The second FPGA 2 has second OH function modules 20. In addition, the second OH function modules 20 each have a static OH processing module 201.

The second OH function modules 20 have a function of providing overhead data to be added to a data signal by the first OH function modules 14. Second OH function modules 20 are provided corresponding to the first OH function modules 14 on one-to-one basis. The number of second OH function modules 20 may be larger than or equal to that of the first OH function modules 14. In this embodiment, the number of second OH function modules 20 is y (y≥m).

The static OH processing modules 201 have overhead data whose specifications correspond to the process performed by the first OH function modules 14. The specifications of overhead included in the static OH processing modules 201 are ones that might be changed. In addition, each static OH processing module 201 has one overhead data block. Each of the static OH processing modules 201 is an example of an "information storage module".

Since the second OH function modules 20 output overhead data included in the static OH processing modules 201 included therein to the first OH function modules 14, the second OH function modules 20 invariably provide the first OH function modules 14 with the same overhead data. In other words, each second OH function module 20 statically provides each first OH function module 14 with overhead data.

If an update of a second OH function module 20 is performed, the CPU 5 reconfigures the second FPGA 2 using configuration data, which is stored in the flash ROM 4, for changing the specifications of overhead of the static OH processing module 201 to new specifications. More specifically, an FPGA configuration controller 101 reconfigures the second FPGA 2 upon receiving an instruction from the CPU 5. Thus, the second OH function module 20 is upgraded. Furthermore, the CPU 5 performs initial setting of all the y static OH processing modules 201 using overhead setting data held by a backup memory 103. Each of the second OH function modules 20 is an example of a "first signal output module". The overhead data output from each second OH function module 20 is an example of "information regarding a first control signal".

The flash ROM 4 stores configuration data of the second FPGA 2 for changing the specifications of overhead input by an operator using the operation terminal 400 to new specifications.

The monitoring controller 300 receives error information or the like from IFs 100. The monitoring controller 300 then outputs the error information or the like to the operation terminal 400 and notifies an operator of the error information or the like. The operator refers to the error information or the like and inputs overhead setting data and data signal setting data using the operation terminal 400.

The monitoring controller 300 has a backup memory 301. The monitoring controller 300 receives overhead setting data and data signal setting data input by an operator using the operation terminal 400 and stores the data in the backup memory 301. The monitoring controller 300 then outputs the overhead setting data and the data signal setting data to the IF 100.

In addition, the monitoring controller 300 receives configuration data, which is input by the operator using the operation terminal 400, of the second FPGA 2 for changing the specifications of a second OH function module 20 to new specifications. The monitoring controller 300 then outputs, to the IF 100, the received configuration data of the second FPGA 2 for changing the specifications of the second OH function module 20 to new specifications.

A monitoring control IF 102 is an interface for communicating data between the monitoring controller 300 and an IF 100.

The FPGA configuration controller 101 configures the second FPGA 2 using configuration data of the second FPGA 2 for changing the specifications of a second OH function module 20 stored in the flash ROM 4 to new specifications upon receiving an instruction from the CPU 5. The FPGA configuration controller 101 also configures the first FPGA 1 in the same manner.

The CPU 5 stores, in the backup memory 103, data signal setting data and overhead setting data input from the monitoring controller 300. In addition, the CPU 5 makes the setting of the data signal processor 3 using data signal setting data stored in the backup memory 103. In addition, the CPU 5 makes the setting of a second OH function module 20 using overhead setting data stored in the backup memory 103. Here, since the data signal setting data and the overhead setting data are also stored in the backup memory 301 of the monitoring controller 300, the data signal setting data and the overhead setting data may not necessarily be stored in the backup memory 103. In that case, the CPU 5 reads the data signal setting data or the overhead setting data from the backup memory 301 to make the setting of the data signal processor 3 or the second FPGA 2.

In addition, the CPU 5 controls the update of the second FPGA 2. For example, the CPU 5 issues a command for executing an update of the second FPGA 2 to the FPGA configuration controller 101 and notifies the first OH function module 14 of the update of the second FPGA 2. The CPU 5 is an example of an "update controller".

Figure 3:
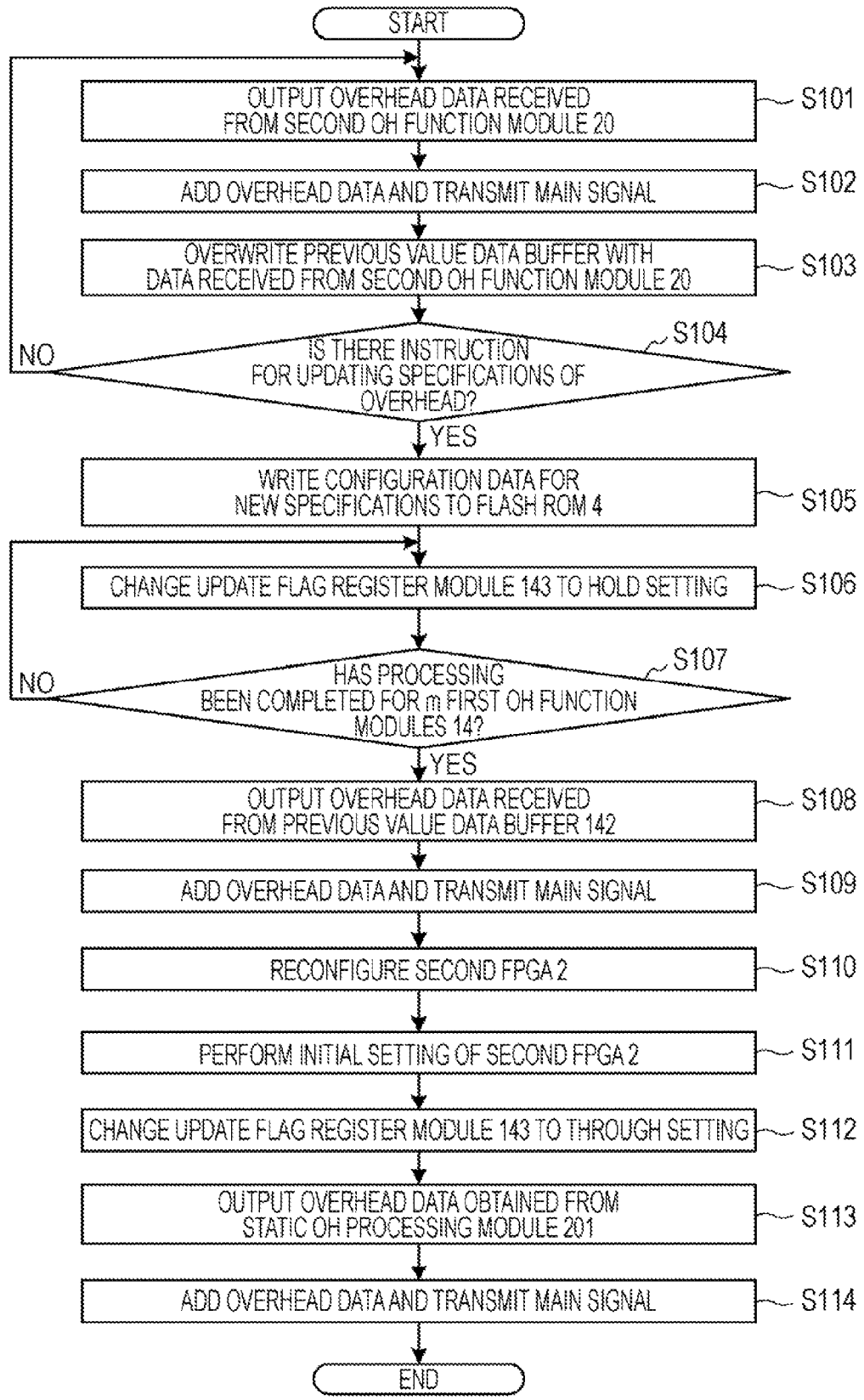
FIG. 3 is a flowchart illustrating a process for updating the specifications of overhead in the transmission apparatus according to the first embodiment.

Next, the flow of a process for updating the specifications of overhead in the transmission apparatus according to this embodiment will be described with reference to FIG. 3. FIG. 3 is a flowchart illustrating the process for updating the specifications of overhead in the transmission apparatus according to the first embodiment.

A first OH function module 14 outputs overhead data received from a second OH function module 20 to the data signal processor 3 (operation S101).

The data signal processor 3 adds the overhead data output from the fixed OH function modules 13 and the first OH function modules 14 to a data signal and transmits the resultant data signal to the other apparatus (operation S102).

The previous value data buffer 142 overwrites overhead data stored therein with the overhead data received from the second OH function module 20 (operation S103).

The CPU 5 determines whether or not the CPU 5 has received an instruction for updating the specifications of overhead of the second OH function module 20 from the operation terminal 400 (operation S104). If the CPU 5 has not received an instruction for updating the specifications of overhead (NO in operation S104), the process returns to operation S101.

On the other hand, if the CPU 5 has received an instruction for updating the specifications of overhead (YES in S104), the CPU 5 writes configuration data having new specifications to the flash ROM 4 (operation S105).

The update flag register module 143 changes the setting to the hold setting (operation S106). In this case, overwriting of overhead data is prevented in the previous value data buffer 142, and the selection module 141 is instructed to select overhead data output from the previous value data buffer 142.

The CPU 5 determines whether or not the processing in operation S106 has been completed for all the m first OH function modules 14 (operation S107). If there is any first OH function module 14 for which the processing has not been completed (NO in operation S107), the process returns to operation S106.

On the other hand, if the processing has been completed for all the first OH function modules 14 (YES in operation S107), the first OH function modules 14 output overhead data received from the previous value data buffer 142 to the data signal processor 3 (operation S108).

The data signal processor 3 adds overhead data output from the fixed OH function modules 13 and the first OH function modules 14 to a data signal and transmits the resultant data signal to the other apparatus (operation S109).

The FPGA configuration controller 101 reconfigures the second FPGA 2 using data stored in the flash ROM 4 (operation S110).

The CPU 5 performs initial setting of the second FPGA 2 using overhead setting data stored in the backup memory 103 (operation S111).

The update flag register module 143 changes the setting to the through setting (operation S112).

The selection module 141 outputs overhead data obtained from the static OH processing module 201 to the data signal processor 3 (operation S113).

The data signal processor 3 adds overhead data output from the fixed OH function modules 13 and the first OH function modules 14 to a data signal and transmits the resultant data signal to the other apparatus (operation S114).

Here, for convenience of description, the update of the second FPGA 2 in operations S110 and S111 is performed after the addition of data output from the previous value data buffer 142 and the transmission of a data signal in operations S108 and S109 in the flowchart of FIG. 3. However, in practice, operations S108 and S109 are still being executed while operations S110 and S111 are being performed.

As described above, the transmission apparatus according to the first embodiment performs a process for statically adding overhead data to a data signal. While the specifications of the overhead are being updated, overhead data immediately before the update is added to the data signal and the resultant data signal is transmitted to the other apparatus. In doing so, it is possible to avoid causing a data signal fail even while the specifications of overhead are being updated. That is, it is possible to execute a specification change of processing of overhead without causing a data signal fail.

In addition, the size of circuits in an overhead processing module in the transmission apparatus according to this embodiment is advantageously the same as that of circuits for performing normal processing of overhead, except for an increase due to the previous value data buffer 142. Therefore, the size of circuits in the overhead processing module according to this embodiment can be restricted to approximately half that of circuits in a transmission apparatus in which overhead processing modules are fully duplicated, as well as fabrication costs being reduced.

Figure 4:
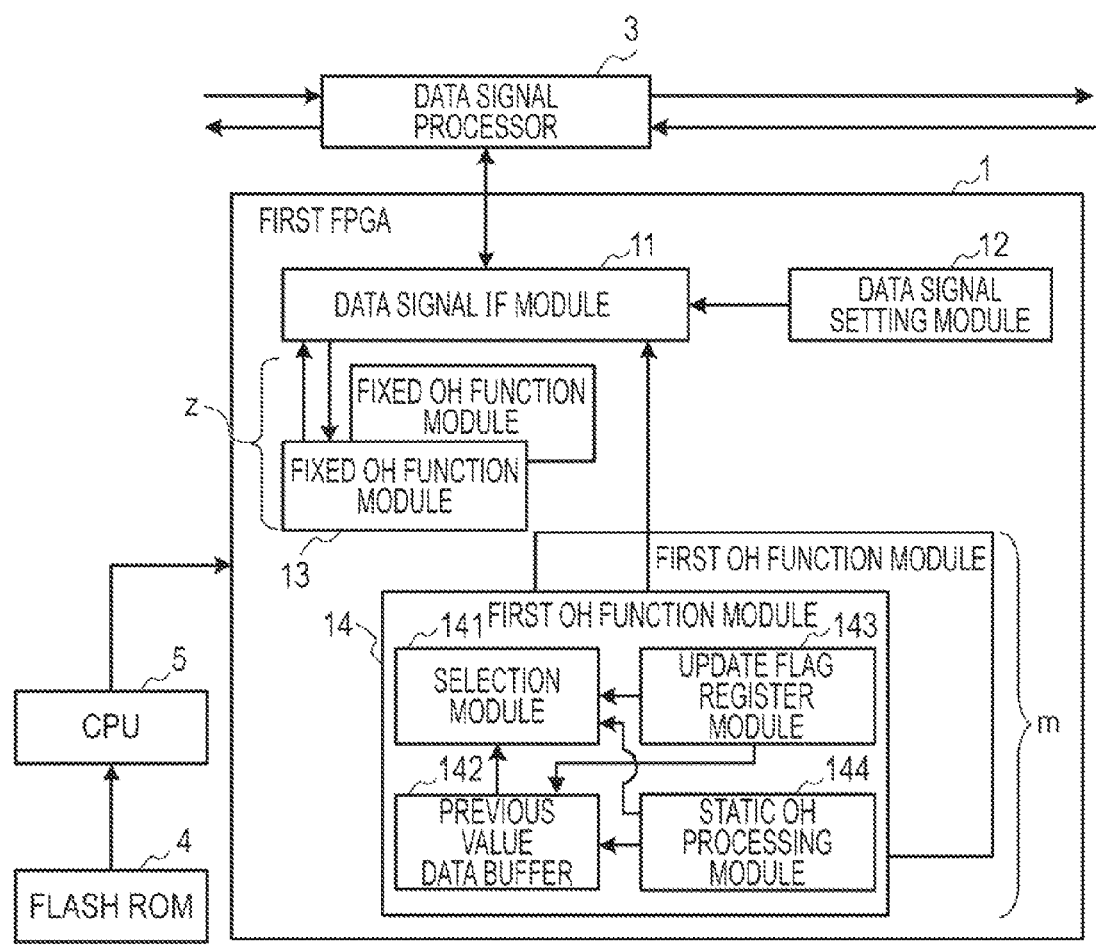
FIG. 4 is a block diagram of a transmission apparatus according to a modification of the first embodiment.

FIG. 4 is a block diagram of a transmission apparatus according to a modification of the first embodiment. This modification is different from the embodiment in that an FPGA capable of performing partial configuration is used therein.

Because the FPGA capable of performing partial configuration is used as the first FPGA 1, the first FPGA 1 can have the function of the second FPGA 2 according to the first embodiment.

The first OH function modules 14 each have the selection module 141, the previous value data buffer 142, the update flag register module 143, and a static OH processing module 144. Here, the static OH processing module 144 has the function of the static OH processing module 201 according to the first embodiment.

When the static OH processing module 144 has been selected as the source of overhead data, the selection module 141 switches the source of overhead data to the previous value data buffer 142 upon receiving a switching instruction from the update flag register module 143. The selection module 141 then outputs overhead data received from the previous value data buffer 142 to the data signal IF module 11. At this time, the selection module 141 prevents data input from the static OH processing module 144 from overwriting a data signal.

In addition, when the previous value data buffer 142 has been selected as the source of overhead data, the selection module 141 switches the source of overhead data to the static OH processing module 144 upon receiving an switching instruction from the update flag register module 143. The selection module 141 then receives overhead data from the static OH processing module 144 and outputs the overhead data received from the static OH processing module 144 to the data signal IF module 11.

In the normal operation, the previous value data buffer 142 overwrites overhead data stored therein with overhead data output from the static OH processing module 144.

When an update of the static OH processing module 144 is performed, the previous value data buffer 142 prevents overhead data output from the static OH processing module 144 from overwriting overhead data stored therein upon receiving an instruction for preventing overwriting from the update flag register module 143. That is, the previous value data buffer 142 keeps holding the overhead data stored therein. The previous value data buffer 142 then outputs the overhead data held thereby to the selection module 141.

Furthermore, when an update of the static OH processing module 144 has been completed, the previous value data buffer 142 resumes overwriting the overhead data stored therein with overhead data output from the static OH processing module 144 upon receiving an instruction for resuming overwriting from the update flag register module 143.

In the normal operation, the update flag register module 143 instructs the previous value data buffer 142 to perform overwriting the overhead data output from the static OH processing module 144 until receiving a notice that an update of the static OH processing module 144 will be performed. Furthermore, in the normal operation, the update flag register module 143 instructs the selection module 141 to select the overhead data output from the static OH processing module 144 until receiving a notice that an update of the static OH processing module 144 will be performed.

Upon receiving a notice that an update of the static OH processing module 144 will be performed, the update flag register module 143 instructs the previous value data buffer 142 to prevent performing overwriting the overhead data output from the static OH processing module 144. Furthermore, upon receiving the notice that the update of the static OH processing module 144 will be performed, the update flag register module 143 instructs the selection module 141 to select the overhead data output from the previous value data buffer 142.

Upon receiving a notice that the update of the static OH processing module 144 has been completed, the update flag register module 143 instructs the previous value data buffer 142 to perform overwriting the overhead data output from the static OH processing module 144. In addition, upon receiving the notice that the update of the static OH processing module 144 has been completed, the update flag register module 143 instructs the selection module 141 to select the overhead data output from the static OH processing module 144.

Since the first FPGA 1 can perform the partial configuration, it is possible to update only the static OH processing module 144. The reconfiguration of the static OH processing module 144 is performed by the FPGA configuration controller 101 using configuration data, which is stored in the flash ROM 4, for changing the specifications of overhead of the static OH processing module 144 to new specifications. Furthermore, the CPU 5 performs initial setting of the static OH processing module 144 using overhead setting data held by the backup memory 103.

As described above, in the transmission apparatus according to this modification, it is possible to execute a specification change of processing of overhead without causing a data signal fail. Since the partial configuration is performed, it is also possible to suppress adverse effects on other overhead function modules that do not need a specification change.

Figure 5:
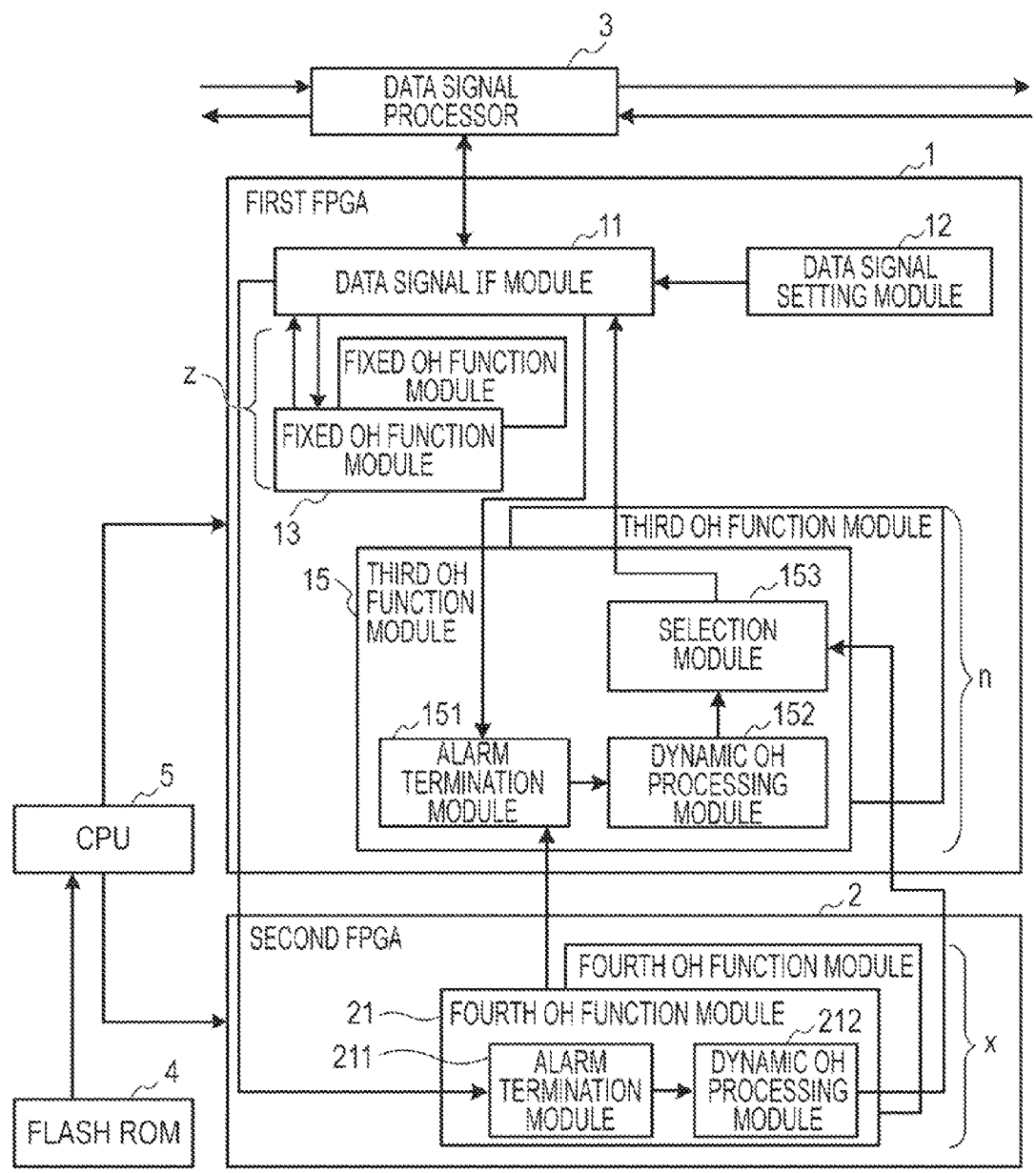
FIG. 5 is a block diagram of a transmission apparatus according to a second embodiment.

FIG. 5 is a block diagram of a transmission apparatus according to a second embodiment. The transmission apparatus according to this embodiment is different from that according to the first embodiment in that overhead data that is suitable for a data signal is selected from among multiple overhead data blocks, and the selected overhead data is added to the data signal. In other words, the transmission apparatus according to this embodiment dynamically changes overhead data to be added to a data signal. More specifically, this includes a case in which a function of switching a transmission path is included in information of an overhead. The overall configuration of the transmission apparatus according to this embodiment is also represented by FIG. 2. In FIG. 5, components having the same reference numerals as in FIG. 1 have the same functions unless otherwise described.

The first FPGA 1 has the data signal IF module 11, the data signal setting module 12, the fixed OH function modules 13, and third OH function modules 15.

In processing of overhead performed by the third OH function modules 15, overhead data that is suitable for the content of a data signal is output. One third OH function module 15 is provided for each overhead function. That is, there are the same number (n in this embodiment) of third OH function modules 15 as the number of overhead functions that might be subjected to a specification change.

A third OH function module 15 receives, from the CPU 5, a notice that a fourth OH function module 21, which will be described later, will be updated. In addition, the third OH function module 15 receives, from the CPU 5, a notice that an update of the fourth OH function module 21 has been completed.

In addition, the third OH function modules 15 each have an alarm termination module 151, a dynamic OH processing module 152, and a selection module 153. Each of the third OH function modules 15 is an example of a "second signal output module". Overhead data output by each of the third OH function modules 15 is an example of "data of control signal".

The alarm termination module 151 detects an alarm from a data signal included in the data signal IF module 11 and terminates the detected alarms. The alarm termination module 151 then outputs the content of the detected alarm to the dynamic OH processing module 152.

The dynamic OH processing module 152 stores multiple overhead data blocks. The dynamic OH processing module 152 also stores data of the correspondence relation between the content of alarms and the multiple overhead data blocks in advance.

Furthermore, if an update of a fourth OH function module 21 is performed in a state in which the selection module 153, which will be described later, has selected a dynamic OH processing module 212, the dynamic OH processing module 152 receives, from the CPU 5, an instruction for changing the correspondence relation between the content of alarms and the multiple overhead data blocks. The dynamic OH processing module 152 then, immediately before the update, changes the correspondence relation between the content of alarms and the multiple overhead data blocks in accordance with a process for selecting overhead performed by the fourth OH function module 21, and stores data of the new correspondence relation. For example, in the case of a process for selecting a transmission path in accordance with the content of alarms, the dynamic OH processing module 152 determines which transmission path is selected when a certain content of alarm has been received, and stores data of the correspondence relation between overhead data blocks for selecting transmission paths corresponding to alarms and the content of alarms.

On the other hand, if an update of a fourth OH function module 21 is performed in a state in which the selection module 153 has selected the dynamic OH processing module 152, the dynamic OH processing module 152 keeps performing a process that is currently being performed.

The dynamic OH processing module 152 receives the content of an alarm detected by the alarm termination module 151. The dynamic OH processing module 152 then extracts overhead data corresponding to the content of the received alarm. The dynamic OH processing module 152 then outputs the extracted overhead data to the selection module 153.

The selection module 153 receives, from the CPU 5, an instruction for selecting either the dynamic OH processing module 152 or the dynamic OH processing module 212. The selection module 153 then obtains overhead data output from the selected dynamic OH processing module and outputs the obtained overhead data to the data signal IF module 11.

Now, the selection of either the dynamic OH processing module 152 or the dynamic OH processing module 212 performed by the selection module 153 will be specifically described. First, when the transmission apparatus is activated, the selection module 153 selects either the dynamic OH processing module 152 or the dynamic OH processing module 212 in accordance with the specifications of a data signal.

After that, if an update of a fourth OH function module 21 is performed in a state in which the dynamic OH processing module 152 has been selected, the selection module 153 keeps selecting the dynamic OH processing module 152. When the update of the fourth OH function module 21 has been completed, the selection module 153 switches the selection to the dynamic OH processing module 212.

On the other hand, if an update of a fourth OH function module 21 is performed in a state in which the dynamic OH processing module 212 has been selected, the selection module 153 switches the selection to the dynamic OH processing module 152. When the update of the fourth OH function module 21 has been completed, the selection module 153 switches the selection to the dynamic OH processing module 212.

In the second FPGA 2, when all the n third OH function modules 15 output overhead data output from the dynamic OH processing modules 152 to the data signal IF module 11, only a region necessary to form the fourth OH function module 21 is provided and therefore there is no fourth OH function module 21. In the second FPGA 2, a region is provided whose size is such that a number of fourth OH function modules 21 that are expected to be updated in relation to the n third OH function modules 15 can be included therein. In this embodiment, x fourth OH function modules 21 are provided.

In a state in which the third OH function modules 15 are provided with overhead data from the fourth OH function modules 21, the second FPGA 2 has a number of fourth OH function modules 21 that are used by the third OH function modules 15. The fourth OH function modules 21 each have an alarm termination module 211 and the dynamic OH processing module 212.

That is, a fourth OH function module 21 is formed on the second FPGA 2 if a specification change of overhead is performed in a state in which a third OH function module 15 outputs overhead data output from the dynamic OH processing module 152 to the data signal IF module 11. In addition, a fourth OH function module 21 formed on the second FPGA 2 can be updated. Each of the fourth OH function modules 21 is an example of a "first signal output module".

The alarm termination module 211 detects an alarm from a data signal included in the data signal IF module 11 and terminates the detected alarm. The alarm termination module 211 then outputs the content of the detected alarm to the dynamic OH processing module 212.

The dynamic OH processing module 212 holds overhead data whose specifications correspond to a process performed by the third OH function modules 15. The specifications of overhead included in the dynamic OH processing module 212 are ones that might be changed. The dynamic OH processing module 212 has multiple overhead data blocks. The dynamic OH processing module 212 stores in advance the correspondence relation between contents of alarms detected by the alarm termination module 211 and the multiple overhead data blocks stored therein.

The dynamic OH processing module 212 obtains, from among the multiple overhead data blocks included therein, overhead data corresponding to a content of an alarm detected by the alarm termination module 211.

A fourth OH function module 21 outputs the overhead data obtained by the dynamic OH processing module 212 to a third OH function module 15. In other words, each of the fourth OH function modules 21 dynamically changes overhead data and provides each of the third OH function modules 15 with the changed overhead data.

If an update of a fourth OH function module 21 is performed, the FPGA configuration controller 101 reconfigures the second FPGA 2 using configuration data, which is stored in the flash ROM 4, for changing the specifications of overhead of the dynamic OH processing module 212 to new specifications. Thus, the fourth OH function module 21 is upgraded. Furthermore, the CPU 5 performs initial setting of all the x dynamic OH processing modules 212 using overhead setting data held by a backup memory 103.

Figure 6:
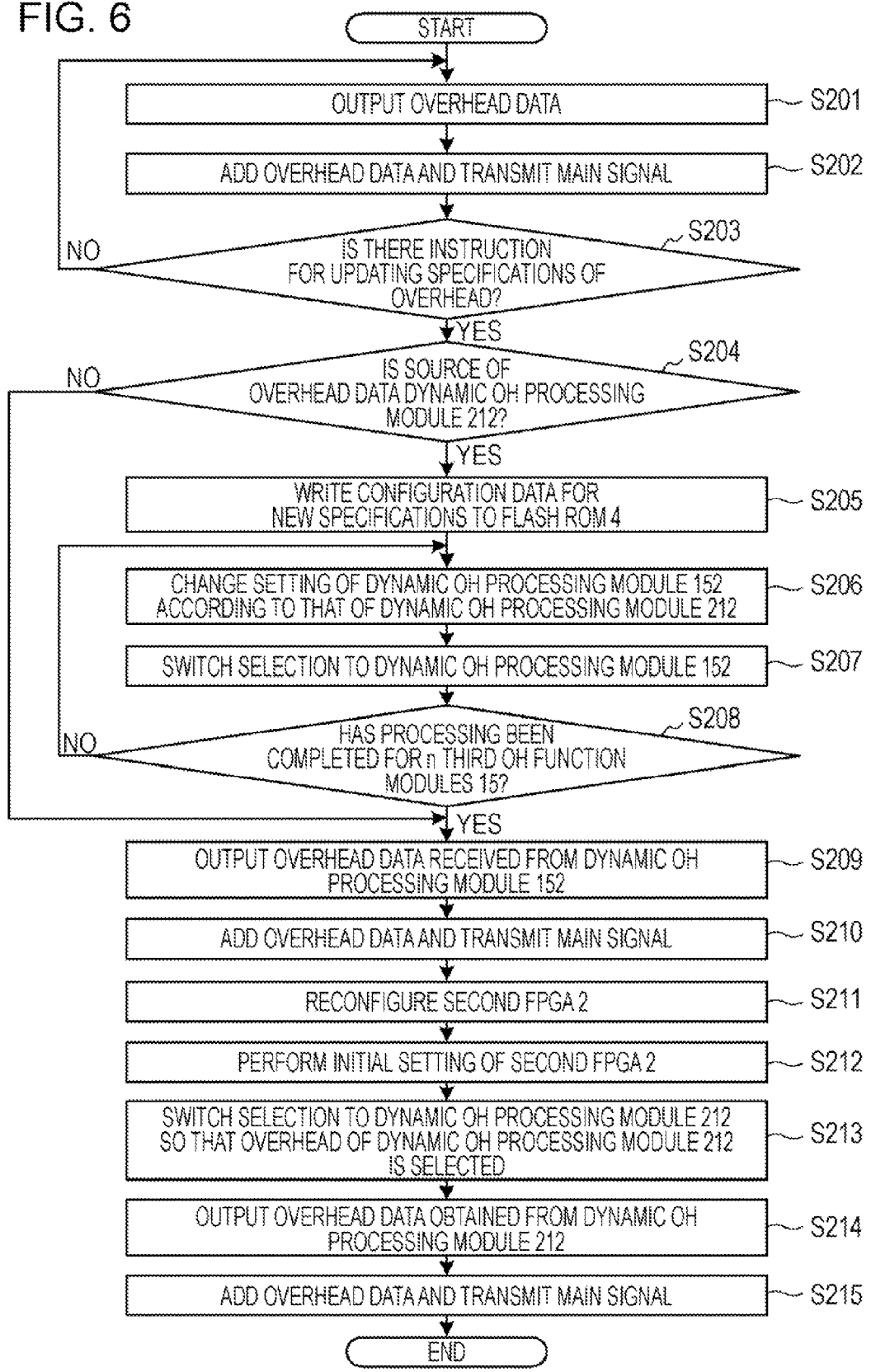
FIG. 6 is a flowchart illustrating a process for updating the specifications of overhead in the transmission apparatus according to the second embodiment.

Next, the flow of a process for updating the specifications of overhead in the transmission apparatus according to this embodiment will be described with reference to FIG. 6. FIG. 6 is a flowchart illustrating the process for updating the specifications of overhead in the transmission apparatus according to the second embodiment.

The selection module 153 selects either the dynamic OH processing module 152 or the dynamic OH processing module 212 in accordance with the specifications of a data signal and outputs overhead data of the selected module to the data signal IF module 11 (operation S201).

The data signal processor 3 adds the overhead data output from the fixed OH function modules 13 and the third OH function module 15 to the data signal and transmits the resultant data signal to the other apparatus (operation S202).

The CPU 5 determines whether or not the CPU 5 has received, from the operation terminal 400, an instruction for changing the specifications of overhead (operation S203). If the CPU 5 has not received an instruction for changing the specifications of overhead (NO in operation S203), the process returns to operation S201.

On the other hand, if the CPU 5 has received an instruction for changing the specifications of overhead (YES in S203), the CPU 5 determines whether or not the source of overhead data added to the data signal is the dynamic OH processing module 212 (operation S204).

If the source of overhead data is the dynamic OH processing module 212 (YES in operation S204), the CPU 5 writes configuration data for new specifications to the flash ROM 4 (operations S205).

The dynamic OH processing module 152 changes the setting for processing overhead data, such as selection of data, in accordance with the setting of the dynamic OH processing module 212 (operation S206).

The selection module 153 switches the selection to the dynamic OH processing module 152 and obtains overhead data output from the dynamic OH processing module 152 (operation S207).

The CPU 5 determines whether or not the processing in operations S205 to S207 has been completed for all the n third OH function modules 15 (operation S208). If there is any third OH function module 15 for which the processing has not been completed (NO in operation S208), the process returns to operation S206.

On the other hand, if the processing has been completed for all the third OH function modules 15 (YES in operation S208) or if the source of overhead data is the dynamic OH processing module 152 (NO in operation S204), the selection module 153 outputs overhead data received from the dynamic OH processing module 152 to the data signal IF module 11 (operation S209).

The data signal processor 3 adds overhead data output from the fixed OH function modules 13 and the third OH function modules 15 to a data signal and transmits the resultant data signal to the other apparatus (operation S210).

The FPGA configuration controller 101 reconfigures the second FPGA 2 using data stored in the flash ROM 4 (operation S211).

The CPU 5 performs initial setting of the second FPGA 2 using overhead setting data stored in the backup memory 103 (operation S212).

The selection module 153 switches the selection to the dynamic OH processing module 212 and obtains overhead data output from the dynamic OH processing module 212 (operation S213).

The selection module 153 outputs the overhead data obtained from the dynamic OH processing module 212 to the data signal IF module 11 (operation S214).

The data signal processor 3 adds overhead data output from the fixed OH function modules 13 and the third OH function modules 15 to a data signal and transmits the resultant data signal to the other apparatus (operation S215).

Here, for convenience of description, the update of the second FPGA 2 in operations S211 and S212 is performed after the addition of data output from the dynamic OH processing module 152 and the transmission of a data signal in operations S209 and S210 in the flowchart of FIG. 6. However, in practice, operations S209 and S210 are still being executed while operations S211 and S212 are being performed.

As described above, the transmission apparatus according to the second embodiment dynamically changes overhead data in accordance with the specifications of a data signal and adds the overhead data to the data signal. While the specifications of overhead are being updated, the transmission apparatus according to the second embodiment adds overhead that has been subjected to a process corresponding to a process immediately before the update to the data signal and transmits the resultant data signal to the other apparatus. In doing so, it is possible to avoid causing a data signal fail even while the specifications of overhead are being updated. That is, it is possible to execute a specification change of processing of overhead without causing a data signal fail even when overhead data is dynamically changed in accordance with the specifications of a data signal and added to the data signal.

In addition, the size of circuits in all the overhead processing modules in the transmission apparatus according to this embodiment is one obtained by adding the number (x in this embodiment) of overhead processing modules that are expected to be changed in the future to circuits for performing normal processing of overhead. Therefore, the size of circuits in the overhead processing module according to this embodiment can be restricted to be smaller than that of circuits in a transmission apparatus in which overhead processing modules are fully duplicated, as well as fabrication costs being reduced.

Figure 7:
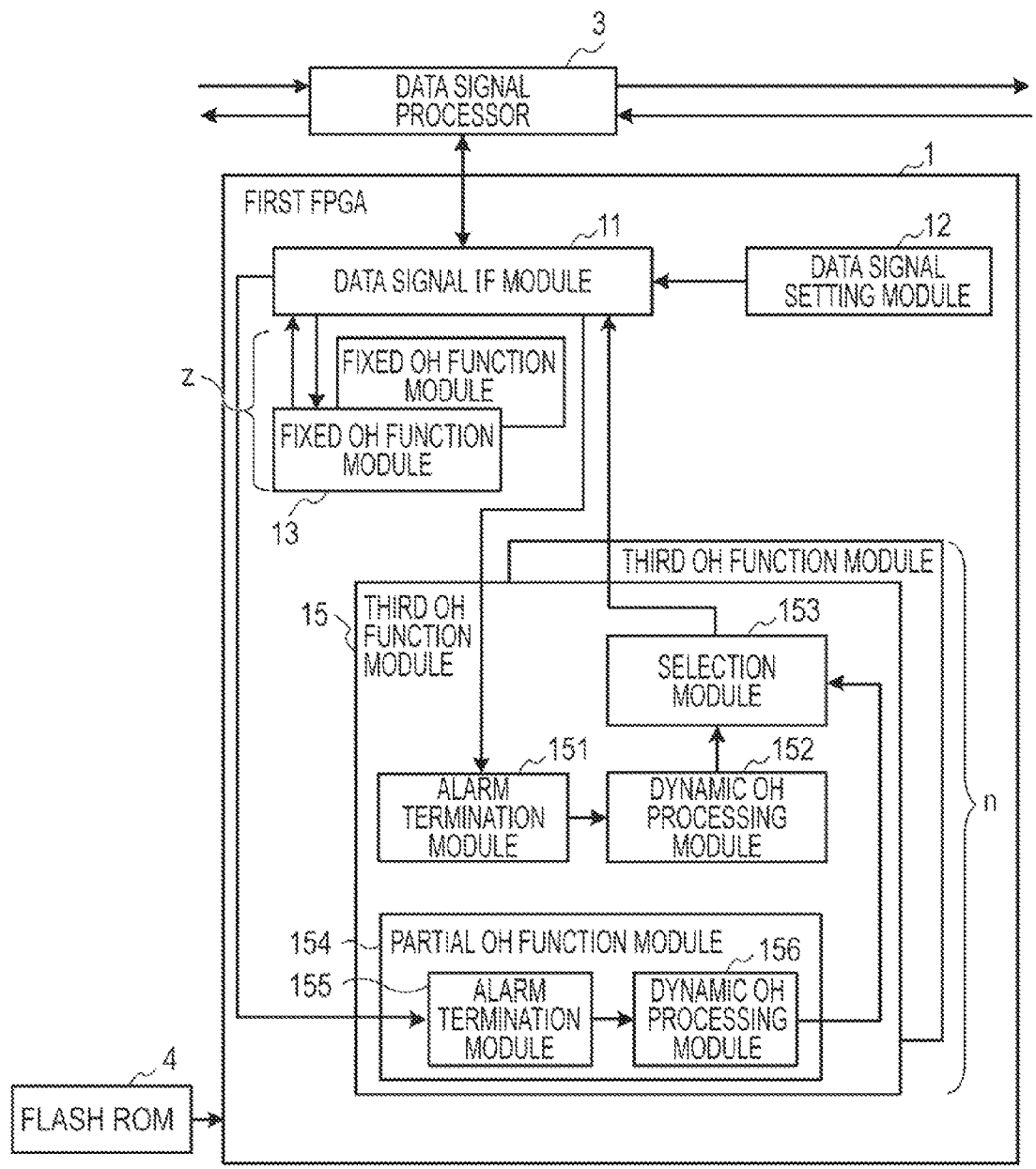
FIG. 7 is a block diagram of a transmission apparatus according to a modification of the second embodiment.

FIG. 7 is a block diagram of a transmission apparatus according to a modification of the second embodiment. This modification is different from the second embodiment in that an FPGA capable of performing partial configuration is used therein.

Because the FPGA capable of performing partial configuration is used as the first FPGA 1, the first FPGA 1 can have the function of the second FPGA 2 according to the second embodiment.

The third OH function module 15 has the alarm termination module 151, the dynamic OH processing module 152, the selection module 153, and a partial OH function module 154. The partial OH function module 154 has an alarm termination module 155 and a dynamic OH processing module 156. Here, the partial OH function module 154 has the function of fourth OH function module 21 in the second FPGA 2 according to the second embodiment.

The alarm termination module 151 detects an alarm from a data signal included in the data signal IF module 11 and terminates the detected alarm. The alarm termination module 151 then outputs the content of the detected alarm to the dynamic OH processing module 152.

The dynamic OH processing module 152 stores multiple overhead data blocks. The dynamic OH processing module 152 also stores data of the correspondence relation between the content of alarms and the multiple overhead data blocks in advance.

Furthermore, if an update of the partial OH function module 154 is performed in a state in which the selection module 153 has selected the dynamic OH processing module 156, the dynamic OH processing module 152 receives, from the CPU 5, an instruction for changing the correspondence relation between the content of alarms and the multiple overhead data blocks. The dynamic OH processing module 152 then changes the correspondence relation between the content of alarms and the multiple overhead data blocks in accordance with a process such as selection of overhead data performed by the dynamic OH processing module 156 immediately before the update, and stores data of the new correspondence relation.

On the other hand, if an update of the partial OH function module 154 is performed in a state in which the selection module 153 has selected the dynamic OH processing module 152, the dynamic OH processing module 152 keeps performing a process that is currently being performed.

The dynamic OH processing module 152 receives the content of an alarm detected by the alarm termination module 151. The dynamic OH processing module 152 then extracts overhead data corresponding to the content of the received alarm. The dynamic OH processing module 152 then outputs the extracted overhead data to the selection module 153.

The selection module 153 receives, from the CPU 5, an instruction for selecting either the dynamic OH processing module 152 or the dynamic OH processing module 156. The selection module 153 then obtains overhead data output from the selected dynamic OH processing module and outputs the obtained overhead data to the data signal IF module 11.

Now, the selection of either the dynamic OH processing module 152 or the dynamic OH processing module 156 performed by the selection module 153 will be specifically described. First, when the transmission apparatus is activated, the selection module 153 selects either the dynamic OH processing module 152 or the dynamic OH processing module 156 in accordance with the specifications of a data signal.

After that, if an update of the partial OH function module 154 is performed in a state in which the dynamic OH processing module 152 has been selected, the selection module 153 keeps selecting the dynamic OH processing module 152. When the update of the partial OH function module 154 has been completed, the selection module 153 switches the selection to the dynamic OH processing module 156.

On the other hand, if an update of the partial OH function module 154 is performed in a state in which the dynamic OH processing module 156 has been selected, the selection module 153 switches the selection to the dynamic OH processing module 152. When the update of the partial OH function module 154 has been completed, the selection module 153 switches the selection to the dynamic OH processing module 156.

The alarm termination module 155 detects an alarm from a data signal included in the data signal IF module 11 and terminates the detected alarm. The alarm termination module 155 then outputs the content of the detected alarm to the dynamic OH processing module 156.

The dynamic OH processing module 156 has multiple overhead data blocks. Furthermore, the dynamic OH processing module 156 stores in advance data of the correspondence relation between the content of alarms detected by the alarm termination module 155 and the multiple overhead data blocks stored therein.

The dynamic OH processing module 156 obtains, from among the multiple overhead data blocks included therein, overhead data corresponding to the content of an alarm detected by the alarm termination module 155.

The dynamic OH processing module 156 outputs the obtained overhead data to the selection module 153.

Since the first FPGA 1 can perform the partial configuration, it is possible to update only the partial OH function module 154. If an update of the partial OH function module 154 is performed, the reconfiguration of the partial OH function module 154 is performed by the FPGA configuration controller 101 using configuration data, which is stored in the flash ROM 4, for changing the specifications of overhead of the dynamic OH processing module 156 to new specifications. Thus, the specifications of the dynamic OH processing module 156 are updated. Furthermore, the CPU 5 performs initial setting of the dynamic OH processing module 156 using overhead setting data held by the backup memory 103.

As described above, in this modification, it is possible to execute a specification change of processing of overhead using the partial configuration performed by an FPGA without causing a data signal fail even when overhead data is dynamically changed in accordance with the specifications of a data signal and added to the data signal. The size of circuits in all the overhead processing modules according to this modification can be restricted to that of circuits obtained by adding at least one overhead processing module to circuits for performing normal processing of overhead. Therefore, the size of circuits can be further reduced.

Figure 8:
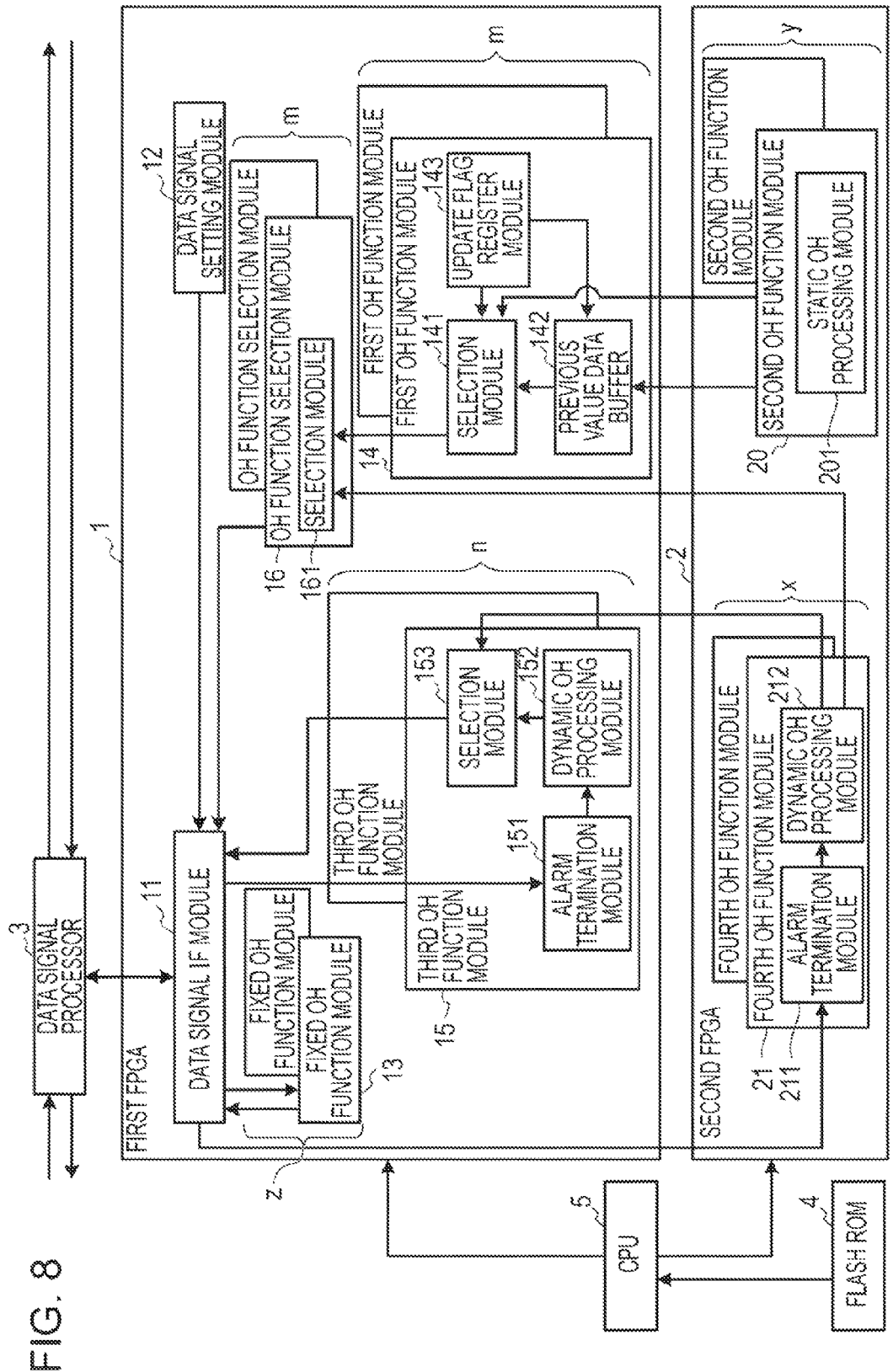
FIG. 8 is a block diagram of a transmission apparatus according to a third embodiment.

FIG. 8 is a block diagram of a transmission apparatus according to a third embodiment. The transmission apparatus according to this embodiment is different from that according to the first embodiment in that a process for adding static overhead data to a data signal can be changed to a process for dynamically changing overhead data to be added to the data signal. The overall configuration of the transmission apparatus according to this embodiment is also represented by FIG. 2. In FIG. 8, components having the same reference numerals as in FIG. 1 have the same functions unless otherwise described.

In this embodiment also, the update of the overhead function of adding a fixed value of overhead data and the update of the overhead function of adding appropriate overhead data corresponding to the specifications of a data signal are the same as in the first embodiment and the second embodiment. However, regardless of updating a second OH function module 20 or a fourth OH function module 21, both the second OH function module 20 and the fourth OH function module 21 need to be stopped. Therefore, even if a second OH function module 20 is updated, each of the third OH function modules 15 needs to perform processing using the alarm termination module 151 and the dynamic OH processing module 152 during the update as in the second embodiment. In addition, even if a fourth OH function module 21 is updated, each of the first OH function modules 14 needs to perform processing using data of the previous value data buffer 142 during the update as in the first embodiment.

Therefore, a case will be described hereinafter in which a state where overhead data that has been output from a second OH function module 20 and obtained by a first OH function module 14 is added to a data signal is changed to a state where overhead data that is suitable for the specifications of the data signal is selected and added to the data signal. This includes, for example, a case in which OH byte, which has not been specified by the recommendation, is to be used.

As illustrated in FIG. 8, the first FPGA 1 has the data signal IF module 11, the data signal setting module 12, the fixed OH function modules 13, the first OH function modules 14, the third OH function modules 15, and OH function selection modules 16.

The OH function selection modules 16 each have a selection module 161.

The selection module 161 selects, upon receiving an instruction from the CPU 5, either the selection module 141 in a first OH function module 14 or the dynamic OH processing module 212 in a fourth OH function module 21 as the source of overhead data to be added to a data signal.

An OH function selection module 16 outputs the overhead data obtained from the module selected by the selection module 161 to the data signal IF module 11.

Now, the operation for selecting a function module performed by the OH function selection module 16 will be specifically described. In this embodiment, since the initial state is a state in which overhead data that has been output from a second OH function module 20 and obtained by the first OH function module 14 is added to a data signal, the selection module 161 is assumed to have selected the selection module 141 in the first OH function module 14 at first. The OH function selection module 16 then receives, through the CPU 5, an instruction for changing from a process, which has been input by the operation terminal 400 and is performed by the static OH processing module 201, of adding overhead data having a fixed value to a process of selecting appropriate overhead data that is suitable for a the specifications of a data signal and adding the overhead data to the data signal. Upon receiving the change instruction, the selection module 161 waits for completion of the setting of the dynamic OH processing module 212 and then performs switching, so that the dynamic OH processing module 212 is selected as the source of overhead data.

Upon receiving an instruction for updating the overhead function from the CPU 5, the update flag register module 143 in the first OH function module 14 changes the setting to the hold setting.

Upon receiving an instruction from the update flag register module 143, the previous value data buffer 142 in the first OH function module 14 prevents overwriting overhead data held thereby. The previous value data buffer 142 then outputs the overhead data held thereby to the selection module 141.

The selection module 141 in the first OH function module 14 has selected and obtained overhead data output by the second OH function module 20 at first. The selection module 141 then outputs the overhead data output by the second OH function module 20 to the OH function selection module 16.

After that, upon receiving an instruction from the update flag register module 143, the selection module 141 selects and obtains overhead data output by the previous value data buffer 142. The selection module 141 then outputs the overhead data output by the previous value data buffer 142 to the OH function selection module 16.

This process of a first OH function module 14 is performed by all the m first OH function modules 14.

Upon receiving an instruction for updating the overhead function, the second FPGA 2 is reconfigured by the FPGA configuration controller 101 using data stored in the flash ROM 4. In this case, configuration data including new specifications of the second OH function module 20 is stored in the flash ROM 4. Thus, the second FPGA 2 is upgraded.

All the y second OH function modules 20 and all the x fourth OH function modules 21 are initialized using overhead setting data stored in the backup memory 103.

When the initialization has been completed, the alarm termination module 211 detects an alarm from a data signal included in the data signal IF module 11 and terminates the detected alarm. The alarm termination module 211 then outputs the content of the detected alarm to the dynamic OH processing module 212.

The dynamic OH processing module 212 obtains, from among the multiple overhead data blocks included therein, overhead data corresponding to the content of the alarm detected by the alarm termination module 211.

The fourth OH function module 21 outputs the overhead data obtained by the dynamic OH processing module 212 to the OH function selection module 16.

Figure 9:
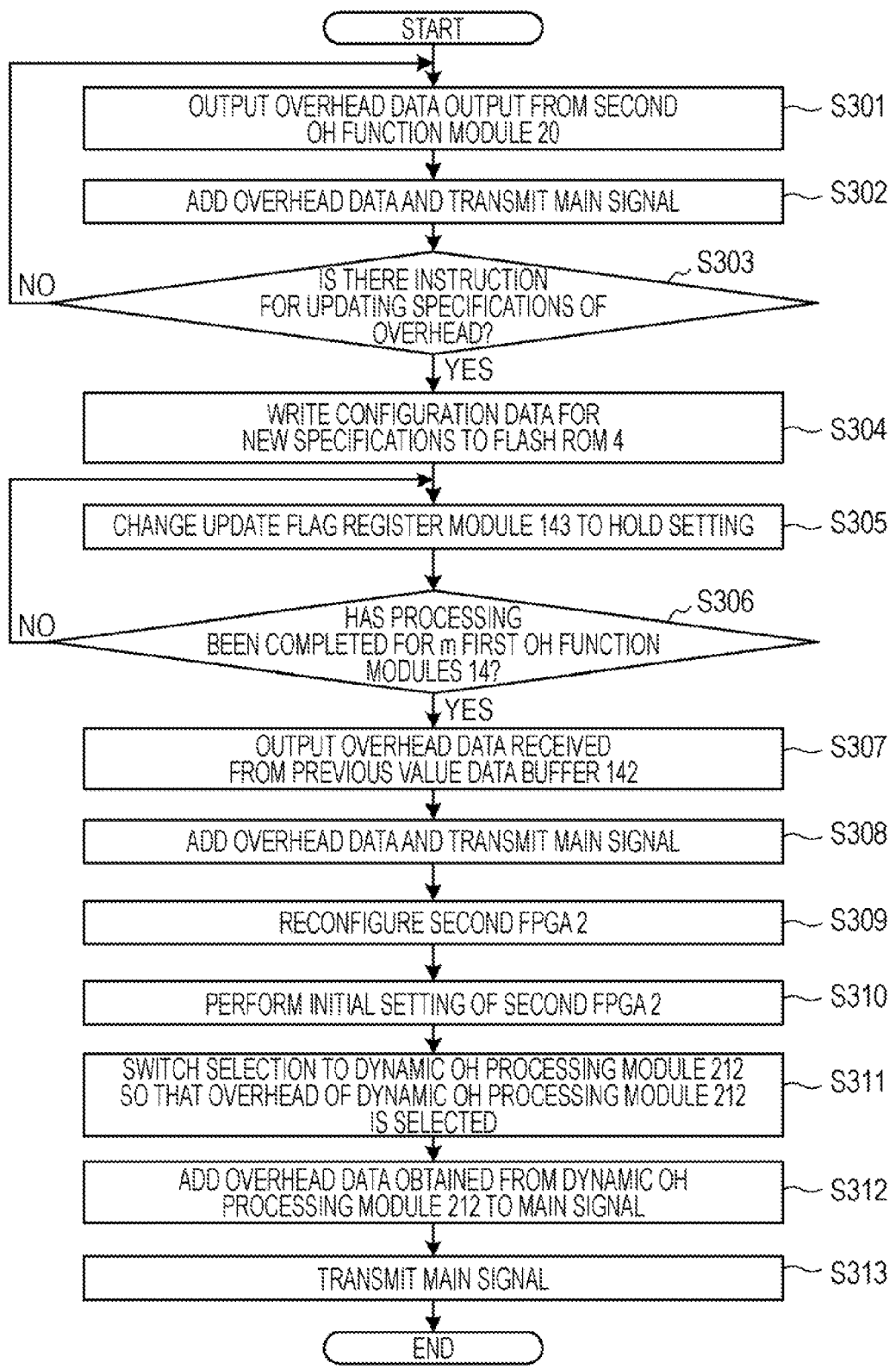
FIG. 9 is a flowchart illustrating a process for updating the specifications of overhead in the transmission apparatus according to the third embodiment.

Next, the flow of a process for updating the specifications of overhead in the transmission apparatus according to this embodiment will be described with reference to FIG. 9. A case will be described in which a state where overhead data that has been output from a second OH function module 20 and obtained by a first OH function module 14 is added to a data signal is changed to a state where overhead data that is suitable for the specifications of the data signal is selected and added to the data signal. FIG. 9 is a flowchart illustrating the process for updating the specifications of overhead in the transmission apparatus according to the third embodiment.

The selection module 141 selects the second OH function module 20, and then obtains overhead data from the second OH function module 20 and outputs the overhead data. The selection module 161 selects and obtains overhead data output from the first OH function module 14. An OH function selection module 16 outputs the overhead data obtained by the selection module 161 to the data signal IF module 11 (operation S301).

The data signal processor 3 adds overhead data input from the fixed OH function modules 13 and the OH function selection modules 16 to a data signal and transmits the resultant data signal to the other apparatus (operation S302).

The CPU 5 determines whether or not the CPU 5 has received an instruction for changing the specifications of overhead from the operation terminal 400 (operation S303).

If the CPU 5 has not received an instruction for changing the specifications of overhead (NO in operation S303), the process returns to operation S301.

On the other hand, if the CPU 5 has received an instruction for changing the specifications of overhead (YES in S303), the CPU 5 writes configuration data for new specifications to the flash ROM 4 (operation S304).

The update flag register module 143 changes the setting to the hold setting (operation S305). In this case, overwriting of overhead data is prevented in the previous value data buffer 142, and the selection module 141 is instructed to select overhead data output from the previous value data buffer 142.

The CPU 5 determines whether or not the processing in operation S305 has been completed for all the m first OH function modules 14 (operation S306). If there is any first OH function module 14 for which the processing has not been completed (NO in operation S306), the process returns to operation S305.

On the other hand, if the processing has been completed for all the first OH function modules 14 (YES in operation S306), the selection module 141 obtains overhead data output from the previous value data buffer 142. The first OH function module 14 outputs the overhead data obtained by the selection module 141 to the selection module 161. The OH function selection module 16 outputs the overhead data obtained from the previous value data buffer 142 that has been output from the first OH function module 14 and obtained by the selection module 161 to the data signal IF module 11 (operation S307).

The data signal processor 3 adds overhead data output from the fixed OH function modules 13 and the OH function selection module 16 to a data signal and transmits the resultant data signal to the other apparatus (operation S308).

The FPGA configuration controller 101 reconfigures the second FPGA 2 using data stored in the flash ROM 4 (operation S309).

The CPU 5 performs initial setting of the second FPGA 2 using overhead setting data stored in the backup memory 103 (operation S310).

The selection module 161 switches the selection to the dynamic OH processing module 212 and obtains overhead data from the dynamic OH processing module 212 (operation S311).

The OH function selection module 16 outputs the overhead data that has been obtained by the selection module 161 from the dynamic OH processing module 212 to the data signal IF module 11 (operation S312).

The data signal processor 3 adds overhead data output from the fixed OH function modules 13 and the OH function selection module 16 to a data signal and transmits the resultant data signal to the other apparatus (operation S313).

Here, for convenience of description, the update of the second FPGA 2 in operations S309 and S310 is performed after the addition of data output from the dynamic OH processing module 152 and the transmission of a data signal in operations S307 and S308 in the flowchart of FIG. 9. However, in practice, operations S307 and S308 are still being executed while operations S309 and S310 are being performed.

As described above, in the transmission apparatus according to the third embodiment, it is possible to avoid causing a data signal fail even when a process for statically adding overhead data to a data signal is updated to a process for adding overhead data corresponding to the specifications of the data signal to the data signal. That is, it is possible to execute a specification change of processing of overhead without causing a data signal fail.

In addition, the size of circuits in all the overhead processing modules in the transmission apparatus according to this embodiment can be restricted to be smaller than that of circuits in a transmission apparatus in which overhead processing modules are fully duplicated. More specifically, the size of circuits according to this embodiment is advantageously the same as that of circuits for performing normal processing of overhead, except for an increase due to the number (x in this embodiment) of overhead processing modules that are expected to be changed in the future, the OH function selection module 16, the previous value data buffer 142, and each selection module. Therefore, the size of circuits in the overhead processing module according to this embodiment can be restricted to be smaller than that of circuits in overhead processing modules that are fully duplicated, as well as fabrication costs being reduced.

Modification of the Third Embodiment

Figure 10:
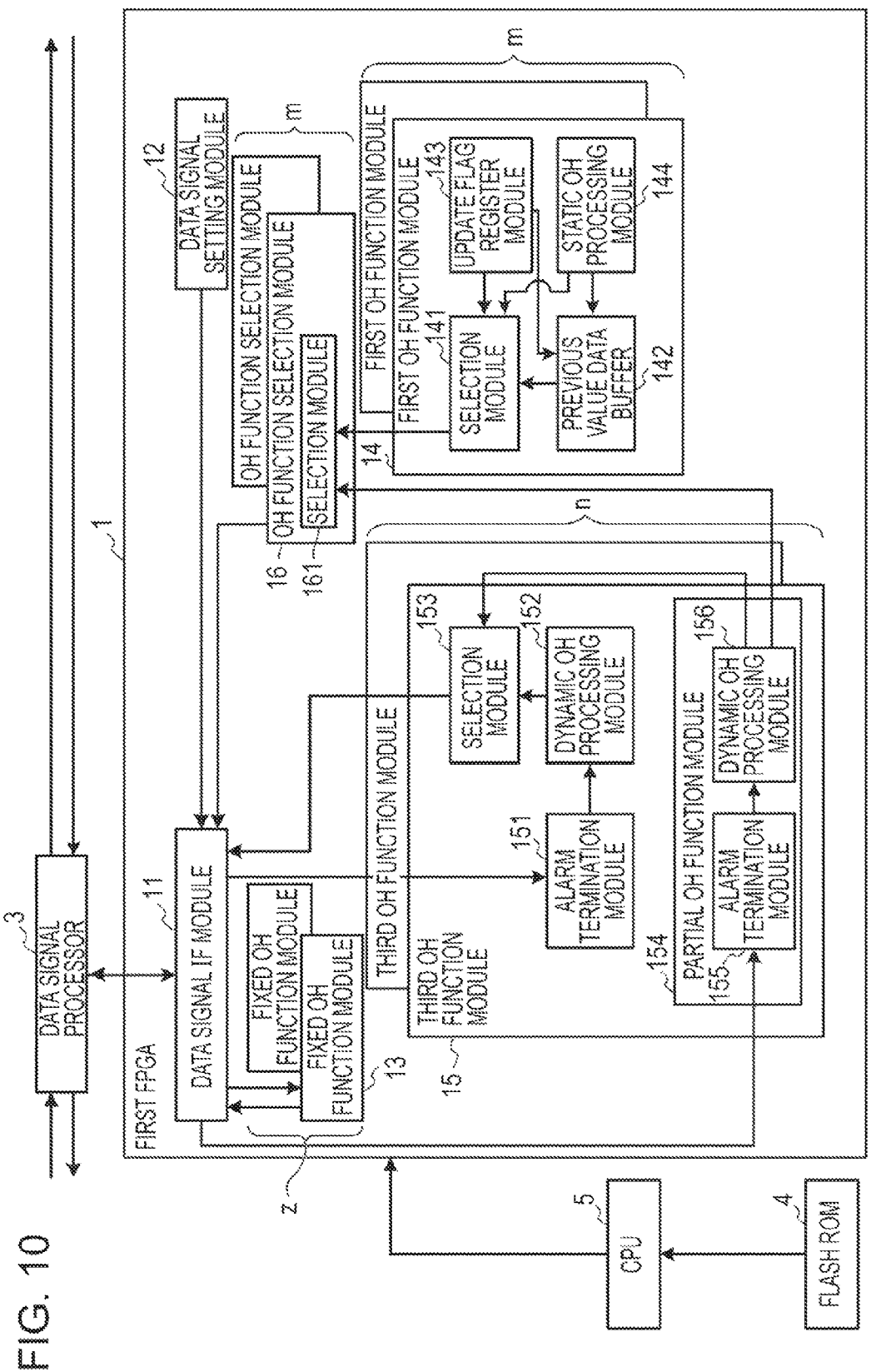
FIG. 10 is a block diagram of a transmission apparatus according to a modification of the third embodiment.

FIG. 10 is a block diagram of a transmission apparatus according to a modification of the third embodiment. This modification is different from the third embodiment in that an FPGA capable of performing partial configuration is used therein.

Because the FPGA capable of performing partial configuration is used as the first FPGA 1, the first FPGA 1 can have the function of the second FPGA 2 according to the third embodiment.

In this modification, the update of the overhead function of adding fixed overhead and the update of the overhead function of adding appropriate overhead corresponding to the specifications of a data signal are the same as in the modification of the first embodiment and the modification of the second embodiment.

Therefore, a case will be described hereinafter in which a state where an OH function selection module 16 receives overhead data from the static OH processing module 144 through the selection module 141 and adds the overhead data to a data signal is changed to a state where the OH function selection module 16 selects overhead data that is suitable for the specifications of the data signal and adds the overhead data to the data signal.

The OH function selection modules 16 each have the selection module 161.

The selection module 161 selects, upon receiving an instruction from the CPU 5, either the selection module 141 in a first OH function module 14 or the dynamic OH processing module 156 in a third OH function module 15 as the source of overhead data to be added to a data signal.

The OH function selection module 16 adds the overhead data obtained from the module selected by the selection module 161 to the data signal included in the data signal data IF module 11.

The first OH function modules 14 each have the selection module 141, the previous value data buffer 142, the update flag register module 143, and the static OH processing module 144. Here, the static OH processing module 144 has the function of the static OH processing module 201 in the second FPGA 2 according to the third embodiment.

When the static OH processing module 144 has been selected as the source of overhead data, the selection module 141 switches the source of overhead data to the previous value data buffer 142 upon receiving a switching instruction from the update flag register module 143. The selection module 141 then adds overhead data output from the previous value data buffer 142 to a data signal included in the data signal IF module 11. At this time, the selection module 141 prevents data output from the static OH processing module 144 from overwriting the data signal.

In addition, when the previous value data buffer 142 has been selected as the source of overhead data, the selection module 141 switches the source of overhead data to the static OH processing module 144 upon receiving a switching instruction from the update flag register module 143. The selection module 141 then receives overhead data from the static OH processing module 144 and adds the overhead data received from the static OH processing module 144 to a data signal included in the data signal IF module 11.

In the normal operation, the previous value data buffer 142 overwrites overhead data stored therein with overhead data output from the static OH processing module 144.

When an update of the static OH processing module 144 is performed, the previous value data buffer 142 prevents overhead data output from the static OH processing module 144 from overwriting overhead data stored therein upon receiving an instruction for preventing overwriting from the update flag register module 143. That is, the previous value data buffer 142 keeps holding the overhead data stored therein. The previous value data buffer 142 then outputs the overhead data held thereby to the selection module 141.

Furthermore, when the update of the static OH processing module 144 has been completed, the previous value data buffer 142 resumes overwriting the overhead data stored therein with overhead data output from the static OH processing module 144 upon receiving an instruction for resuming overwriting from the update flag register module 143.

In the normal operation, the update flag register module 143 instructs the previous value data buffer 142 to perform overwriting the overhead data output from the static OH processing module 144 until receiving a notice that an update of the static OH processing module 144 will be performed. Furthermore, in the normal operation, the update flag register module 143 instructs the selection module 141 to select the overhead data output from the static OH processing module 144 until receiving a notice that an update of the static OH processing module 144 will be performed.

Upon receiving a notice that an update of the static OH processing module 144 will be performed, the update flag register module 143 instructs the previous value data buffer 142 to prevent performing overwriting the overhead data output from the static OH processing module 144. Furthermore, upon receiving the notice that an update of the static OH processing module 144 will be performed, the update flag register module 143 instructs the selection module 141 to select the overhead data output from the previous value data buffer 142.

Upon receiving a notice that the update of the static OH processing module 144 has been completed, the update flag register module 143 instructs the previous value data buffer 142 to perform overwriting the overhead data output from the static OH processing module 144. In addition, upon receiving the notice that the update of the static OH processing module 144 has been completed, the update flag register module 143 instructs the selection module 141 to select the overhead data output from the static OH processing module 144.

The third OH function modules 15 each have the alarm termination module 151, the dynamic OH processing module 152, and the selection module 153, as well as the partial OH function module 154. Furthermore, the partial OH function module 154 has the alarm termination module 155 and the dynamic OH processing module 156.

Since the first FPGA 1 can perform the partial configuration, it is possible to update only the partial OH function module 154. If an update of the partial OH function module 154 is performed, the reconfiguration of the partial OH function module 154 is performed by the FPGA configuration controller 101 using configuration data, which is stored in the flash ROM 4, for changing the specifications of overhead of the dynamic OH processing module 156 to new specifications. Thus, the specifications of the dynamic OH processing module 156 are updated. Furthermore, the CPU 5 performs initial setting of the dynamic OH processing module 156 using overhead setting data held by the backup memory 103.

When the initialization has been completed, the alarm termination module 155 detects an alarm from a data signal included in the data signal IF module 11 and terminates the detected alarm. The alarm termination module 155 then outputs the content of the detected alarm to the dynamic OH processing module 156.

The dynamic OH processing module 156 obtains, from among the multiple overhead data blocks included therein, overhead data corresponding to the content of the alarm detected by the alarm termination module 155.

The partial OH function module 154 outputs the overhead data obtained by the dynamic OH processing module 156 to an OH function selection module 16.

As described above, in this modification, it is possible to execute a specification change of overhead using the partial configuration performed by an FPGA without causing a data signal fail even in a case in which a state where a fixed value is added is changed to a state where appropriate overhead data is selected and added to a data signal. Since the partial configuration is performed, the size of circuits in all the overhead processing modules according to this modification can be restricted to that of circuits obtained by adding at least one overhead processing module to circuits for performing normal processing of overhead. Therefore, the size of circuits can be further reduced.

For example, assume that there is a transmission apparatus in which the number of overhead processing modules that add fixed value of overhead data is 10 and the number of overhead processing modules that add appropriate data in accordance with a data signal is 10. When the size of circuits in one overhead processing module is assumed to be 1, a size of circuits of 20×2=40 is needed if the overhead processing modules are fully duplicated. On the other hand, because the size of circuits becomes 1.2 times as large due to the OH function selection module 16, the previous value data buffer 142, and each selection module, the size of circuits in the transmission apparatus according to this modification is (20+1)×1.2=25.2. Therefore, in this case, the size of circuits in the transmission apparatus according to this modification can be restricted to 63% of that of circuits in a transmission apparatus in which a fully duplicated configuration is adopted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A transmission apparatus, comprising:
a first output processor configured to output first data of a control signal for performing monitoring, maintenance and/or operation of the transmission apparatus and a communication network,
a second output processor, coupled to the first outputprocessor and configured to receive the first data of the control signal and to output second data of the control signal,
a data signal process circuit, coupled to the communication network and to the second output processor, configured to receive data to be transmitted from the communication network and to transmit the received data to be transmitted, to which the second data of the control signal is added, to another transmission apparatus through the communication network; and
a third processor, coupled to the first output processor and the second output processor, configured to execute a procedure, the procedure comprising:
updating a function of the first output processor;
causing the second output processor, during performance of the updating, to hold the first data of the control signal that is output from the first output processor before the updating, and to output the held first data of the control signal to the data signal process circuit as the second data of the control signal; and
causing the second output processor, when the updating is completed, to output the first data of the control signal, received from the first output processor with the updated function, as the second data of the control signal to the data signal process circuit.

2. A method for controlling a transmission apparatus comprising a first module to output first data of a control signal, a second module, coupled to the first module, to receive the first data of the control signal and to output second data of the control signal, a data signal process circuit, coupled to the second module, to receive data to be transmitted and to transmit the received data to be transmitted, to which the second data of the control signal is added, to another transmission apparatus, and a processor coupled to the first module and the second module, the method, executed by the processor, comprising:
updating a function of the first module;
causing the second module to hold the first data of the control signal that is output from the first module before the updating, and to output the held first data of the control signal to the data signal process circuit as the second data of the control signal; and
causing the second module, when the updating is completed, to output the first data of the control signal, received from the first module with the updated function, as the second data of the control signal to the data signal process circuit.

\* \* \* \* \*